United States Patent
Vashisth et al.

(10) Patent No.: US 7,836,213 B2
(45) Date of Patent: Nov. 16, 2010

(54) COUPLING DATA BUFFERS WITH MEMORY INTERFACES

(75) Inventors: Priyank Vashisth, Bangalore (IN); Uday Joshi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 11/605,760

(22) Filed: Nov. 29, 2006

(65) Prior Publication Data

US 2008/0126620 A1 May 29, 2008

(51) Int. Cl.
G06F 3/00 (2006.01)
G06F 13/36 (2006.01)

(52) U.S. Cl. .............................. 710/5; 710/51; 710/306; 710/311; 710/312

(58) Field of Classification Search .................... 710/5, 710/51, 306, 311, 312
See application file for complete search history.

(56) References Cited

U.S. PATENT DOCUMENTS

| 6,009,488 | A | 12/1999 | Kavipurapu ............... 710/105 |
| 6,636,949 | B2* | 10/2003 | Barroso et al. ............. 711/141 |
| 2006/0047899 | A1* | 3/2006 | Ilda et al. ................... 711/113 |
| 2006/0271724 | A1* | 11/2006 | Purcell et al. ................ 711/5 |

* cited by examiner

*Primary Examiner*—Niketa I Patel
(74) *Attorney, Agent, or Firm*—Trop, Pruner & Hu, P.C.

(57) ABSTRACT

In one embodiment, the present invention includes a method including receiving a read request at a first buffer from a first one of multiple interfaces and forwarding the read request from the first buffer to a first memory controller of multiple memory controllers, where the first buffer is dedicated to the first memory controller. Other embodiments are described and claimed.

12 Claims, 4 Drawing Sheets

COUPLING DATA BUFFERS WITH MEMORY INTERFACES

BACKGROUND

Embodiments relate to storage of information associated with transactions within a system.

In many different systems, an interface may be coupled between a processor and memory. Some systems may use a memory controller for this interface, while other systems, including many multiprocessor systems may include a node controller that can provide an interface between multiple processors and an associated memory, which may be formed of one or more memory devices such as dual in-line memory module (DIMM) chips.

This interface between processor and memory, whether as a memory controller or as a node controller, often includes a data buffer to temporarily store incoming transactions and associated data until the transactions are completed. Oftentimes such a buffer may include multiple incoming and outgoing (i.e., read and write) ports. Even if the aggregate bandwidth of the agents and the ports on the buffer are same, traffic congestion can occur because multiple agents may be sending transactions simultaneously. This can be solved by increasing the number of ports of such a buffer, so that more transactions may be handled. However, a buffer with more ports has lower efficiency in terms of bit cell area. Also this kind of approach leads to routing congestion within a chip.

Another approach could be matching aggregate bandwidth of a data buffer and agents on both sides of the data buffer. However, this would require multiplexing data streams while writing into the buffer and demultiplexing while reading from the buffer. In a given system implementation, back pressure while writing from one side or both sides of the buffer can occur. As a result, one or more rate matching buffers may be needed in addition to the data buffer to temporarily store data in case there are more read (or write) transactions in a given cycle than the number of available ports in the buffer. Such rate matching buffers add latency to the transaction paths. Accordingly, interfaces may suffer from increased power consumption, increased latency and greater chip area.

DETAILED DESCRIPTION

In various embodiments, a node controller or other interface between multiple processors of a system and memory can be implemented with multiple buffers to enable buffering of information sent to and from the memory. In various implementations, these multiple buffers may be configured to be tightly coupled with corresponding memory controllers each associated with a part of the memory. In addition, the data buffers may also be coupled to interfaces such as point-to-point (PTP) interfaces that enable communication with an associated processor via a PTP communication protocol. The interconnections between the data buffers and the PTP interfaces may be via a crossbar or other shared interconnect or bus type structure such that the data buffers are tightly coupled with the memory controllers, yet loosely coupled to the PTP interfaces.

Figure 1:
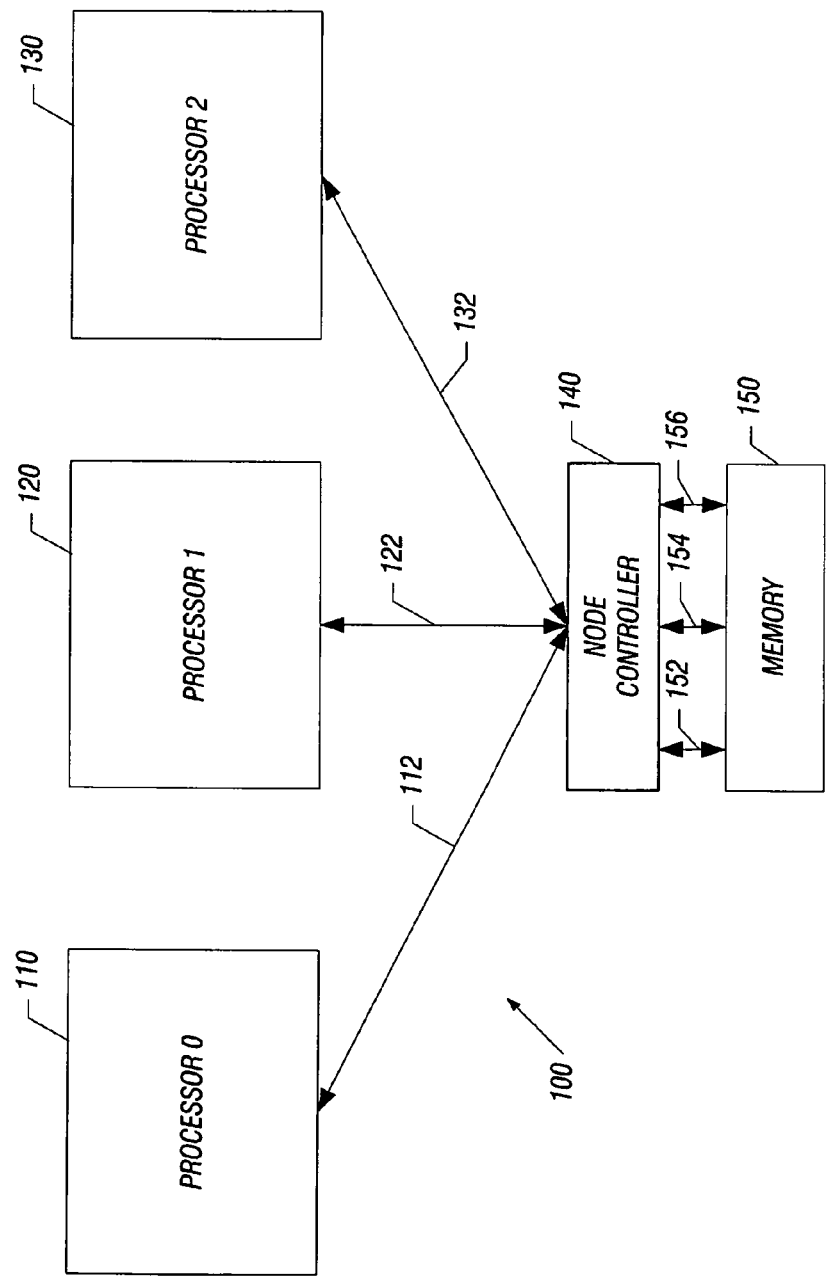
FIG. 1 is a block diagram of a system in accordance with one embodiment of the present invention.

Referring now to FIG. 1, shown is a block diagram of a system in accordance with one embodiment of the present invention. As shown in FIG. 1, system 100, which may be a multiprocessor system, includes a plurality of processors 110, 120, and 130. In various embodiments, such processors may be multiple processors of a single die such as a multi-core or many-core processor, or may be individual processors (or multiple-core processors) of another multiprocessor system. Each of processors 110, 120, and 130 are coupled to a node controller 140 via an associated interconnect 112, 122, and 132. In the embodiment of FIG. 1, these interconnects may be PTP interconnects, although the scope of the present invention is not so limited. In such embodiments, interconnects 112, 122, and 132 may communicate via a serial-based PTP communication protocol.

A node controller may act as a central interface between processors of a system and memory. In the embodiment of FIG. 1, node controller 140 may include various interfaces or controllers to enable translation of incoming communications from processors 110, 120, and 130, which may be according to a PTP communication protocol, to a format appropriate for communication with a memory 150 (which may be a dynamic random access memory (DRAM)) to which node controller 140 is coupled. As shown in FIG. 1 a plurality of interconnects 152, 154, and 156 couple node controller 140 to memory 150. In various implementations, node controller 140 may include interfaces or controllers to enable communication with processors 110, 120, and 130 via a PTP communication protocol, while further enabling communication via a given memory protocol, such as a protocol suitable for a given memory controller associated with memory 150.

To enable efficient communication at high speeds and improved bandwidth, node controller 140 may include multiple data buffers to enable tight or dedicated coupling between such data buffers and memory controllers associated with memory 150, while providing for loose or undedicated coupling between such data buffers and interfaces of node controller 140 associated with processors 110, 120, and 130.

Figure 2:
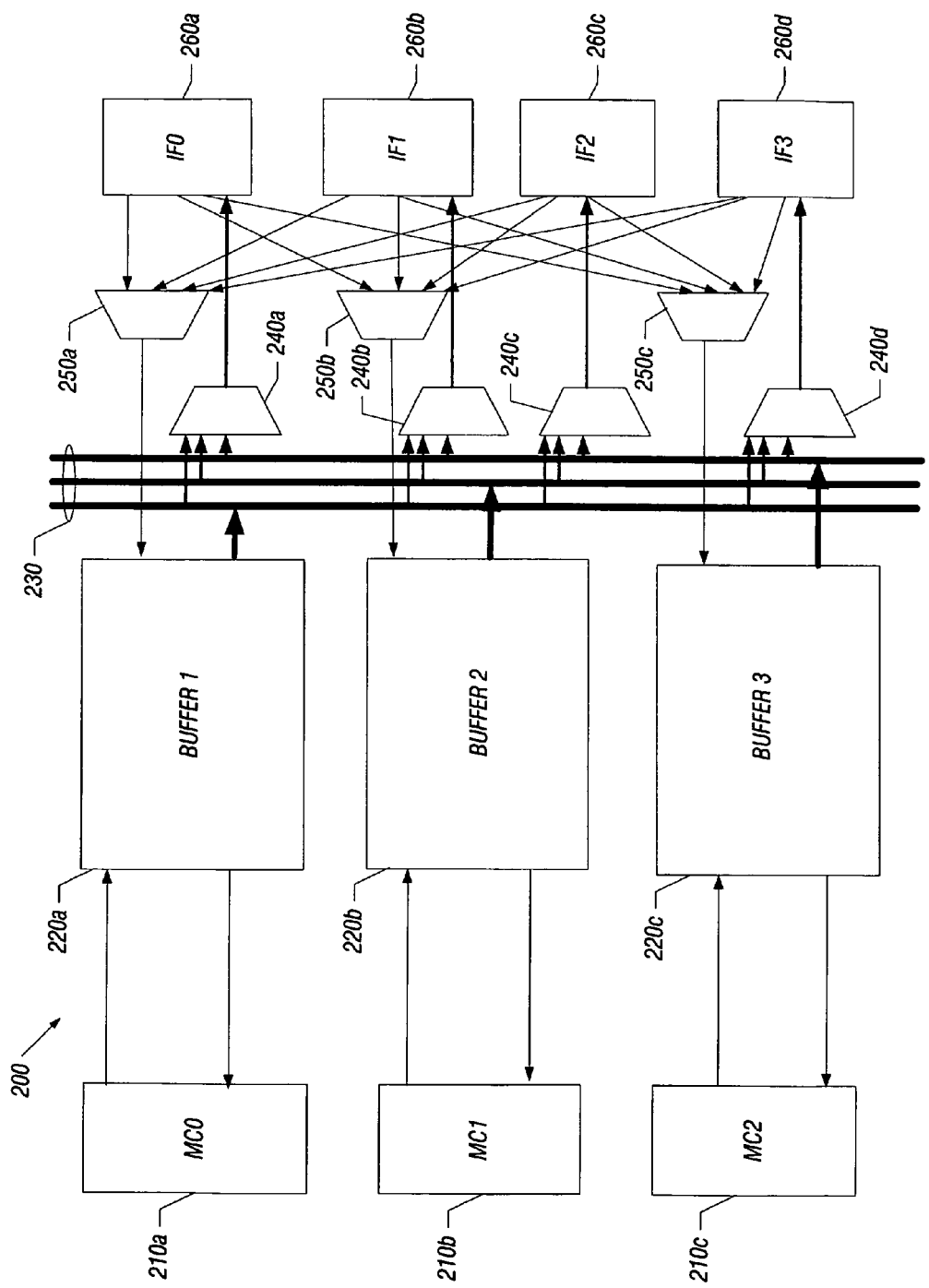
FIG. 2 is a block diagram of a node controller in accordance with one embodiment of the present invention.

Referring now to FIG. 2, shown is a block diagram of a node controller in accordance with one embodiment of the present invention. More specifically, FIG. 2 shows a data path for such a node controller. As shown in FIG. 2, node controller 200 may be present in a given multiprocessor system to enable communication between a processor and memory, which may be a unified memory or different portions of a memory each locally associated with a given processor. Furthermore, node controller 200 may enable translation of memory transactions (i.e., read and write transactions) to and from multiple processors coupled to such memory from a protocol used by the processors for communication with the node controller to a communication protocol used between the node controller and memory.

As shown in FIG. 2, node controller 200 includes a plurality of memory controllers $210_a$-$210_c$ (generically memory controller 210). In various embodiments, each memory controller 210 may handle memory transactions with a portion of a memory (not shown in FIG. 2). In some implementations, each memory controller 210 may be coupled to a portion of a memory via a dedicated interconnect. Communication between memory controller 210 and memory may be according to a memory controller-dictated protocol. However, memory controller 210 may receive transactions from buffer

220 via a PTP connection protocol. Thus memory controller 210 may perform translation of incoming transactions from a serial-based PTP communication protocol used by a processor to which node controller 200 may be coupled to a memory controller-based protocol, and vice versa.

Using the embodiment of FIG. 2, write requests from a processor may be processed to provide write data into the memory via memory controller 210, while read requests from the processor may be handled by memory controller 210 to enable reading of the requested data from the associated memory. Thus as shown in FIG. 2, each memory controller 210 includes an incoming port and an outgoing port, both of which may be coupled to an associated data buffer $220_a$-$220_c$ (generically data buffer 220) with which the corresponding memory controller 210 is tightly coupled. Data buffers 220 may be used to temporarily store data associated with various memory transactions. Data buffers 220 may be used to store, for example, data read from memory until an associated read transaction is completed and the data sent to a requesting processor. In the embodiment of FIG. 2, each of data buffers 220 may correspond to a bank having multiple read ports and write ports such that increased efficiency of bandwidth utilization may be realized. In other words, multiple data buffer structures may be provided so that each data buffer 220 may be accessed by a dedicated memory controller 210 without creating routing congestion. This is especially so in implementations in which memory controller 210 is configured to handle, e.g., less than one read and write transaction per cycle. Note that each of data buffers 220 may have a size of x/3, (and even with this reduced size, no buffer overflows occur), where x is the size of a single data buffer that would be designed to handle the same bandwidth as that of FIG. 2.

As further shown in FIG. 2, each of data buffers 220 may further be coupled to a crossbar 230. In place of crossbar 230, another bus or shared interconnect may be present to enable coupling of each of data buffers 220 to a plurality of read multiplexers $240_a$-$240_d$ (generically read multiplexer 240). As shown in the embodiment of FIG. 2, each of read multiplexers 240 may be a 1:3 demultiplexer to receive read inputs from each of data buffers 220 and provide a selected input to a corresponding interface $260_a$-$260_d$ (generically interface 260). In various embodiments, interface 260 may be a PTP interface to communicate with a given processor. Thus each interface 260 may receive read transactions from an associated read multiplexer 240. As shown in the embodiment of FIG. 2, four such interfaces 260 may be present, each coupled to a different agent of a multiprocessor system via a PTP interconnect.

In the embodiment of FIG. 2, data buffers 220 may never fall short for read bandwidth, as the read service rate may be controlled by the rate by which memory controller 210 can handle read requests. As long as there is one read data being written per buffer per clock, it can be dequeued at the same rate, as the bandwidth between data buffer 220 and interface 260 is more than the enqueue bandwidth. In case there were more reads coming towards memory controller 210 than what it could handle, memory controller 210 would block such reads by blocking additional read commands. Since writes are posted in this case, there could be a situation in which all the write commands are meant for a single one of memory controllers 210 for a small amount of time. In this case as write commands directly go to memory controller 210 and the writes are posted, memory controller 210 may give an auto-completion after the write data has been successfully stored in data buffer 220. Since in a typical processor-based system reads and writes may have a ratio of 7:3, total aggregate write bandwidth in node controller 200 may be 1.2 times bandwidth of a write port, i.e., 0.3 bandwidth of a write port multiplied by the four interfaces 260. Since allocating one read port per buffer towards memory is allowed, the total aggregate write bandwidth is very close to the memory controller read bandwidth. In a very unlikely case in which data buffer 220 is filled because of writes, the writes may be back pressured at interface 260, which can then store writes in its data buffer. In various embodiments, blocking writes have no implication on reads, as a global arbiter may prioritize reads over writes.

In various embodiments, interfaces 260 may be interconnected to other system agents via serial links or interconnects. The agents may correspond to processor sockets, hub agents such as chipset components, input/output (I/O) controller hubs (ICHs), other processors or peripheral devices and the like. Interfaces 260 may communicate data via an interconnection hierarchy that typically includes a protocol layer, an optional routing layer, a link layer, and a physical layer.

The protocol layer, which is the highest layer of the interconnection hierarchy, institutes the PTP protocol, which is a set of rules that determines how agents communicate. For example, the protocol sets the format for a transaction packet, which may correspond to the unit of data that is communicated between nodes. Such a packet typically contains information to identify the packet and its purpose (e.g., whether it is communicating data in response to a request or requesting data from another node).

The routing layer determines a path over which data is communicated between nodes. Because each node is not connected to every other node, there are multiple paths over which data may be communicated between two particular nodes. The link layer receives transaction packets from the protocol layer and communicates them in a sequence of flits. The link layer handles flow control, which may include error checking and encoding mechanisms. Through the link layer, each node keeps track of data sent and received and sends and receives acknowledgements in regard to such data.

Finally, the physical layer may include the actual electronics and signaling mechanisms at each node. In a point-to-point, link-based interconnection scheme, there are only two agents connected to each link. The physical layer and link layer include mechanisms to deal with high-speed serial links with relatively high bit error rates, high latency and high round trip latency.

In this hierarchy, the link layer may transmit data in flits (which may be 80 bits in one embodiment), which are then decomposed into phits (e.g., ¼ of a flit length) at the physical layer and are communicated over a PTP interconnect to the physical layer of a receiving agent. The received phits are integrated into flits at the physical layer of the receiving agent and forwarded to the link layer of the receiving agent, which combines the flits into transaction packets for forwarding to the protocol layer of the receiving agent.

As further shown in FIG. 2, each interface 260 may further be coupled to a plurality of write multiplexers $250_a$-$250_c$ (generically write multiplexer 250). As shown in the embodiment of FIG. 2, such write multiplexers may be 4:1 multiplexers to receive inputs from each of interfaces 260 and provide a selected output to an associated data buffer 220. Thus as shown in the embodiment of FIG. 2, read multiplexers 240 may be loosely coupled to each of data buffers 220 and tightly coupled to a given interface 260. In contrast, each of write multiplexers 250 may be loosely coupled with each of interfaces 260, and tightly coupled to a given data buffer 220. Thus in an implementation in which this processor interface side of data buffers 220 has a peak sustained bandwidth of two read or two write transactions per cycle, this arrangement provides for rate matching without the need for rate matching buffers. In various embodiments, read multiplexers 240 and write multiplexers 250 may be statistically controlled to enable efficient bandwidth utilization, particularly if a peak transmission exceeds the system designated bandwidth.

Using an implementation such as that of FIG. 2, data buffers 220 may be tightly coupled with an associated memory controller 210 such that routing congestion between a single data buffer and multiple memory controllers can be avoided. Furthermore, by providing multiple independent data buffers 220, a total aggregate bandwidth may be increased.

In various embodiments, because multiple interfaces 260 may attempt to perform a read/write transaction using the same data buffer 220, a global arbiter may be present to minimize conflicts. In various embodiments, the global arbiter may be present in a distributed manner within interfaces 260 and/or within write multiplexers 250. In this way, the global arbiter may monitor transactions sent from interfaces 260 and attempt to resolve any conflicts, as the global arbiter may act as a statistical multiplexer. For example, assume that interface $260_a$ is to send a first write transaction to buffer $220_a$ via write multiplexer $250_a$ while at the same time second interface $260_b$ also seeks to send a write transaction through write multiplexer $250_a$ to buffer $220_a$. In these instances, the global arbiter may be used to potentially re-route at least one of these write transactions through another write multiplexer (e.g., either write multiplexer $250_b$ or $250_c$) and into a different buffer 220 (e.g., data buffer $220_b$ or $220_c$).

In some implementations, the statistical multiplexing provided by the global arbiter may be used to handle incoming write transaction at a peak rate. That is, a given system may be provisioned for a particular known rate of transactions. When peak data transfer may occur, such peak transactions can be greater than the provisioned bandwidth. Accordingly, statistical multiplexing may reduce, e.g., via a low pass filtering function, such peaks and provide the data to selected buffers 220.

Note that in the embodiment of FIG. 2, each data buffer 220 may include two read ports and two write ports, with one read port and one write port facing memory controllers 210 and the other read and write ports facing interfaces 260. Read and write bandwidth from interface 260 to data buffers 220 may be statistically multiplexed such that the aggregate bandwidth therebetween may be two read ports and two write ports. Because crossbar 230 may act as a full mesh between data buffers 220 and interfaces 260, there may be multiple read or write requests provided to a given data buffer 220. Such conflicts may be handled by the global arbiter to minimize such conflicts. In the event such conflicts do occur, these multiple transactions may be stalled at a given protocol layer (e.g., the link layer) within the conflicting interfaces 260. While shown with this particular implementation in the embodiment of FIG. 2, the scope of the present invention is not limited in this regard. Note that while the embodiment of FIG. 2 shows a block diagram of a node controller including data buffers dedicated or tightly coupled with memory controllers, in other implementations a processor socket or other agent of a system including integrated memory controllers and interfaces such as PTP interfaces may be implemented with separate data buffers as described herein.

Using embodiments of the present invention, the need for rate matching buffers, both between memory controller and data buffer, as well as between data buffer and corresponding interface may be avoided, reducing size, routing complexity, power consumption, and processing complexity as well as improving latency by the number of clock cycles that would be consumed by such rate matching buffers.

Figure 3:
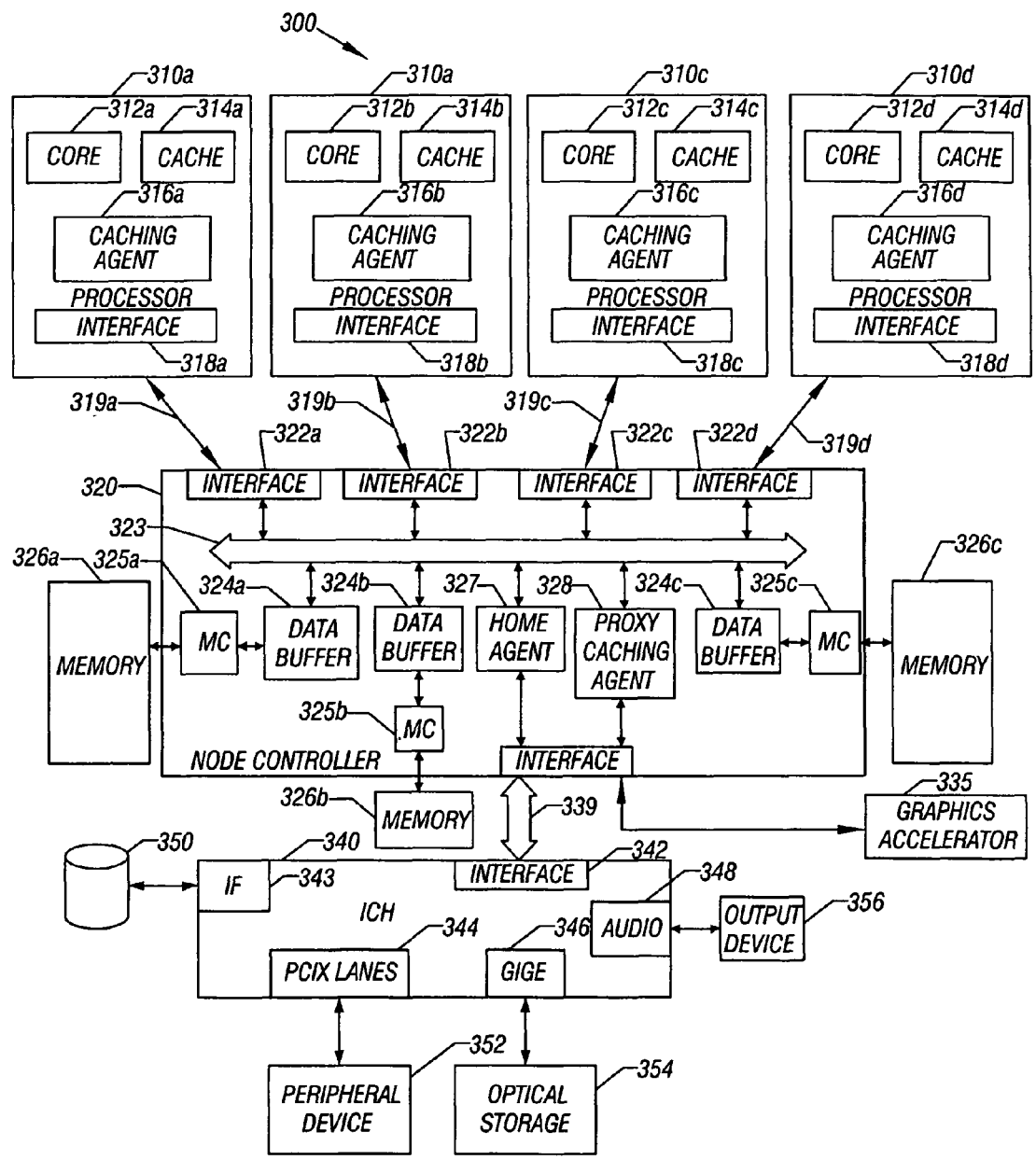
FIG. 3 is a block diagram of a multiprocessor system in accordance with another embodiment of the present invention.

Embodiments may be implemented in many different system types. As one example, a multiprocessor system 300, as shown in FIG. 3 may include a node controller in accordance with an embodiment of the present invention. As shown in FIG. 3, multiple processor sockets $310_a$-$310_d$ (generically processor socket 310) may be coupled to a node controller 320. Each processor socket 310 may include, for example, a core $312_a$-$312_d$ (generically core 312), a cache $314_a$-$314_d$ (generically cache 314), a caching agent $316_a$-$316_d$ (generically caching agent 316), and an interface $318_a$-$318_d$ (generically interface 318). In various embodiments, cache 314 may be a private cache for its associated core 312. Caching agent 316 may be used to communicate between core 312 and other processor agents, while interface 318 may be an interface to provide communication between a given processor socket 310 and node controller 320. In various embodiments, interface 318 may translate transactions from a form used within processor socket 310 to a serial-based PTP communication protocol. As shown in FIG. 3, a plurality of PTP interconnects $319_a$-$319_d$ (generically interconnect 319) may be used to couple each of processor sockets 310 to node controller 320. While interconnect 319 may be a serial-based PTP interconnect in the embodiment of the FIG. 3, the scope of the present invention is not limited in this regard.

Still referring to FIG. 3, node controller 320 may include a plurality of interfaces $322_a$-$322_d$ (generically interface 322) which may be used to communicate with a given processor socket 310. In turn, these interfaces 322 may be coupled to a crossbar 323. While not shown in the embodiment of FIG. 3, understand that interfaces 322 may be coupled to read and write multiplexers, in some implementations. In any event, interfaces 322 may be loosely coupled to a plurality of data buffers $324_a$-$324_c$ (generically buffer 324). In the embodiment of FIG. 3, each data buffer 324 may have a pair of read and write ports, one each of which may be coupled to crossbar 323 and the other coupled to an associated memory controller $325_a$-$325_c$ (generically memory controller 325). Thus as shown in FIG. 3, each data buffer 324 may be tightly coupled with an associated memory controller 325 and loosely coupled to interfaces $322_a$-$322_d$ via crossbar 323.

Each of memory controllers 325 may be coupled to an associated portion of a memory 326, specifically an associated memory $326_a$-$326_c$. While shown with three such memory portions, three memory controllers, four interfaces, and four processors in the embodiment of FIG. 3, the scope of the present invention is not limited in this regard.

Also present in node controller 320 is a home agent 327, which may be used to track transactions to the various portions of memory 326. Similarly, a proxy caching agent 328 may be coupled to crossbar 323 to aid in maintaining coherency between the various caches within system 300. An interface 329 to which home agent 327 and proxy caching agent 328 connect may further be coupled to a graphics accelerator 335 coupled to node controller 320. A link 339 may couple node controller 320 to an ICH 340.

ICH 340 may be used to act as an interface to various peripheral components of system 300. For example, as shown in FIG. 3 an interface 343, which may be a serial advanced attachment (SATA) interface, may be coupled to a disk drive 350; and a plurality of peripheral component interconnect express (PCIx) lanes 344, which may be in accordance with the PCI-Express™ Base Specification Version 1.1 (published Mar. 28, 2005) may be coupled to one or more peripheral devices 352. Similarly, a gigabit Ethernet (GigE) interface 346 may be coupled to an optical storage 354, while an audio interface 348 may be coupled to an output device 356. An interface 342 of ICH 340 may provide communication between these various peripheral devices and corresponding adapters and node controller 340, e.g., in accordance with a PCIx protocol. While shown with this particular implementation in the embodiment of FIG. 3, understand the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 4:
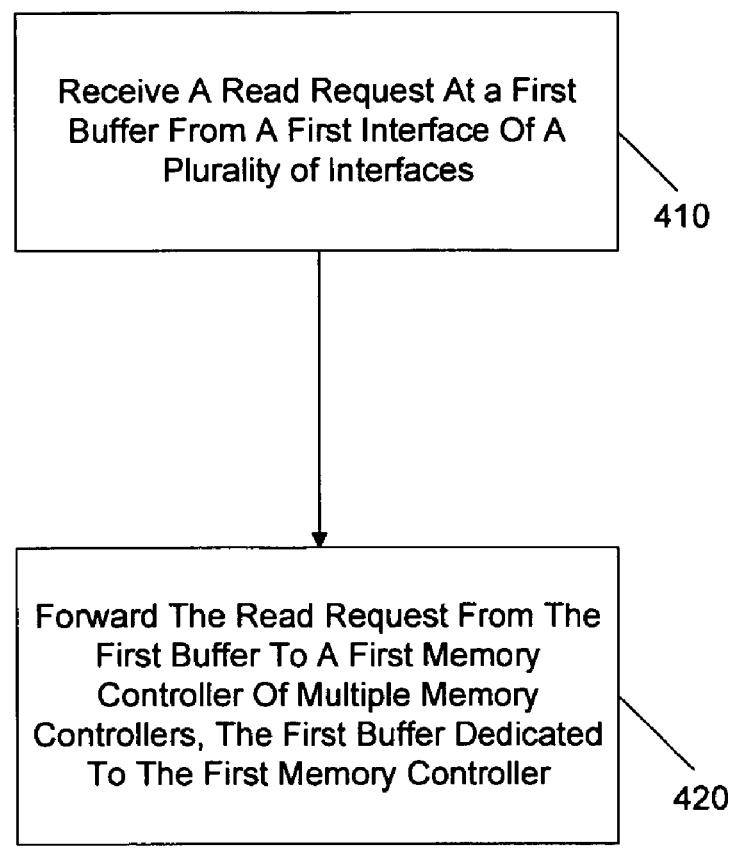
FIG. 4 is a flow diagram of a method in accordance with one embodiment of the present invention.

Referring now to FIG. 4, shown is a flow diagram of a method in accordance with one embodiment of the present invention. As shown in FIG. 4, method 400 may begin by receiving a read request at a first buffer from a first interface of a plurality of interfaces (block 410). This read request then may be forwarded from the first buffer to a first memory controller of multiple memory controllers, where the first buffer is dedicated to the first memory controller (block 420).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a read request at a first buffer from a first interface of a plurality of interfaces, via a first multiplexer coupled to the plurality of interfaces, wherein the first multiplexer is controlled based on statistical multiplexing;
   forwarding the read request from the first buffer to a first memory controller of a plurality of memory controllers, the first buffer dedicated to the first memory controller;
   storing data received from the first memory controller responsive to the read request in the first buffer; and
   providing the data from the first buffer to the first interface via a crossbar coupled between the first buffer and the plurality of interfaces.

2. The method of claim 1, further comprising forwarding the data from the first interface to a first processor coupled to the first interface via a point-to-point interconnect.

3. The method of claim 1, further comprising arbitrating between a plurality of read requests from the plurality of interfaces using a global arbiter, and selecting one of the plurality of read requests for passing to the first buffer.

4. An apparatus comprising:
   a node controller to be coupled between a plurality of processors and a memory, and to translate transactions between a point-to-point (PtP) communication protocol and a memory controller-based protocol, the node controller including:
      a first memory controller directly coupled to a first buffer, the first memory controller to interface with the memory;
      a second memory controller directly coupled to a second buffer, the second memory controller to interface with the memory;
      a plurality of interfaces having an undedicated coupling to the first buffer and the second buffer via a full mesh interconnection, each of the plurality of interfaces coupled to a corresponding processor via a point-to-point interconnect;
      a plurality of first multiplexers each coupled to the full mesh interconnection and to one of the plurality of interfaces to provide read data obtained from the memory to the corresponding interface; and
      a plurality of second multiplexers each coupled to the plurality of interfaces and one of the first buffer and the second buffer to provide write data for storage in the memory to the corresponding first buffer or the second buffer.

5. The apparatus of claim 4, wherein the full mesh interconnection comprises a crossbar.

6. The apparatus of claim 4, wherein the first buffer comprises a first write port and a first read port coupled to the first memory controller and a second read port coupled to the full mesh interconnection.

7. The apparatus of claim 6, wherein the first buffer comprises a second write port coupled to one of the plurality of second multiplexers.

8. The apparatus of claim 4, wherein the plurality of second multiplexers are to be statistically multiplexed.

9. The apparatus of claim 4, wherein the node controller is of a multiprocessor system.

10. A system comprising:
    first and second processors to execute instructions;
    a node controller coupled to each of the first and second processors via a point-to-point interconnect, the node controller to translate memory transactions received from the first processor according to a first communication protocol to a second communication protocol for transmission to a dynamic random access memory (DRAM) and including:
       a first buffer having a dedicated coupling to a first memory controller and undedicated coupling to a plurality of interfaces; and
       a second buffer having a dedicated coupling to a second memory controller and undedicated coupling to the plurality of interfaces;
       a crossbar to couple an output of the first and second buffers to a plurality of first multiplexers each coupled to one of the plurality of interfaces; and
       a plurality of second multiplexers each coupled to the plurality of interfaces and one of the first and second buffers, the plurality of second multiplexers to be statistically multiplexed; and
    the DRAM coupled to the node controller.

11. The system of claim 10, wherein the plurality of interfaces are each coupled to one of the first and second processors via the point-to-point interconnect.

12. The system of claim 10, wherein the node controller is to translate memory transactions received from the first processor according to the first communication protocol to the second communication protocol for transmission to the DRAM.

* * * * *